US007225529B2

(12) United States Patent
Wang

(10) Patent No.: US 7,225,529 B2
(45) Date of Patent: Jun. 5, 2007

(54) BONDING DEVICE

(75) Inventor: Shun-Ping Wang, Taipei County (TW)

(73) Assignee: Inventec Appliances Corporation, Taipei Hsieng (TW)

( * ) Notice: Subject to any disclaimer, the term of this patent is extended or adjusted under 35 U.S.C. 154(b) by 539 days.

(21) Appl. No.: 10/637,617

(22) Filed: Aug. 11, 2003

(65) Prior Publication Data

US 2005/0034301 A1 Feb. 17, 2005

(51) Int. Cl.
*B23P 19/00* (2006.01)

(52) U.S. Cl. ............................ 29/739; 29/759; 29/761

(58) Field of Classification Search .................. 29/729, 29/739–742, 834, 281.1; 269/47, 903; 361/790, 361/803, 807, 704; 257/685–686, 700–704
See application file for complete search history.

(56) References Cited

U.S. PATENT DOCUMENTS 5,901,039 A * 5/1999 Dehaine et al. ............. 361/704
6,112,378 A * 9/2000 Lee ............................. 24/458
RE36,968 E * 11/2000 Shieh ......................... 361/685
6,243,264 B1 * 6/2001 Bollesen et al. ............ 361/704
6,545,879 B1 * 4/2003 Goodwin .................... 361/807
6,711,810 B2 * 3/2004 Buley et al. .................. 29/830
6,826,054 B2 * 11/2004 Liu ............................ 361/719
6,859,367 B2 * 2/2005 Davison ..................... 361/704
7,028,389 B2 * 4/2006 Chang ......................... 29/739

* cited by examiner

*Primary Examiner*—Minh Trinh
(74) *Attorney, Agent, or Firm*—Birch, Stewart, Kolasch & Birch, LLP

(57) ABSTRACT

A bonding device. A plurality of bonding units each has a base and a fastening member. Each base has a first connecting portion, a second connecting portion, and a stopper. An electronic device has a circuit unit and a predetermined element. The circuit unit has several first positioning portions and the predetermined element has several second positioning portions. The first positioning portions and the second positioning portions are through holes. When the predetermined element is attached to the upper surface of the circuit unit by aligning the second positioning portions with the corresponding first positioning portions, the second connecting portion of the base is first fit into the first positioning portions of the circuit unit, then the fastening member passes through the second positioning portion of the predetermined element to couple with the fastening member by several turns. Thus, the predetermined element is fixed on the circuit unit.

15 Claims, 6 Drawing Sheets

BONDING DEVICE

BACKGROUND OF THE INVENTION

1. Field of the Invention

The present invention relates to a bonding device, and in particular to a bonding device provided with a fastening member and a base to connect a printed circuit board to a tube or a liquid crystal module of an electronic device.

2. Description of the Related Art

In FIG. 1*a*, a conventional electronic device P1 such as a mobile phone has a printed-circuit board (PCB) 11, a liquid crystal module 13, a housing 15, a plurality of bolts 17, a first plate 111 and a second plate 131.

The PCB 11 is disposed on the first plate 111 and connected to the liquid crystal module 13 by a wire (not shown), and the liquid crystal module 13 is disposed on the second plate 131. A plurality of first positioning holes 113 are provided on the first plate 111, and a plurality of second positioning holes 133 corresponding to the first positioning holes 113 are provided on the first plate 111. The housing 15, provided with a plurality of posts 153 corresponding to the first positioning holes 113 of the first plate 111 and the second positioning holes 133 of the second plate 131, receives the first plate 111 and the second plate 131. The post 153 is cylindrical and hollow and a threaded portion 153*b* is provided on the inner wall of the post 153.

When aligning the first positioning holes 113 of the first plate 111 and the second positioning holes 133 of the second plate 131 to each post 153 of the housing 15, each bolt 17 passes through the second positioning holes 133 of the second plate 131 and the first positioning holes 113 of the first plate 111 and connects to the threaded portion 153*b* of the posts 153, respectively. Thus, the PCB 11 and the liquid crystal module 13 are mounted on the housing 15, i.e., the liquid crystal module 13 is properly disposed on the housing 15.

In FIG. 1*b*, an electronic device P2 has a printed-circuit board 11', a liquid crystal module 13' and a housing 15'. The PCB 11' is provided with a plurality of first positioning holes 113', and the liquid crystal module 13' is provided with a plurality of second positioning holes 133' corresponding to each first positioning hole 113' of the PCB 11'. Several posts 153' are formed on the housing 15' each corresponding to the first positioning holes 113' of the PCB 11'. The post 153' is cylindrical and hollow, and a threaded portion 153'*b* is provided on the inner wall of the post 153'.

When aligning the second positioning holes 133' of the liquid crystal module 13' and the first positioning holes 113' of the PCB 11' to each post 153' of the housing 15', each bolt 17' passes through the second positioning holes 133' of the liquid crystal module 13' and the first positioning holes 113' of the PCB 11' and connects to the threaded portion 153'*b* of the posts 153', respectively. Thus, the liquid crystal module 13' and the PCB 11' are mounted on the housing 15'.

Based on the structure of the electronic devices P1 and P2, the positioning holes must be directly formed on s the liquid crystal module or the plate to support the liquid crystal module, and the posts corresponding to the positioning holes of the liquid crystal module or the plate must be formed on the housing of the electronic devices P1 and P2. This causes several problems.

First, because the posts are provided on the housing of the electronic devices P1 and P2, device dimensions cannot be efficiently reduced. As well, design and manufacture of the posts formed on the housing is time-consuming, as is assembly of the liquid crystal module, the PCB, the plates and the housing.

In general, there are two ways to form the post on the housing. One is to directly form an inner threaded portion on the inner wall of the hollow post, by, for example, injection molding, and the other is to dispose a nut or the like with an inner threaded portion into the post, by, for example, Thermo Compression (T/C) Bonding, embossing, or other means.

When the inner threaded portion is directly formed on the inner wall of the hollow post, especially for an electronic product with smaller volume, it is difficult to produce threads on the post in the smaller size. The housing is generally made of plastic and the post is integrally formed with the main body of the housing by injection molding. Thus, not only are difficulties encountered in production of threads on the inner wall of the plastic post, but the threaded portion of the post has an inherently short lifetime.

When performing Thermo Compression (T/C) Bonding or embossing to dispose the nut in the post, according to the second stated solution, a hole is provided in the post in advance. The hole is formed by drilling or integrally shaped when the housing is fabricated. The nut is then thermally pressed into the corresponding hole of the post manually, a time-consuming and costly process.

SUMMARY OF THE INVENTION

Accordingly, an object of the invention is to provide a bonding device to connect a circuit unit to a predetermined element of an electronic product, suitable for connecting two objects applied by Surface Mounted Technology (SMT).

The invention provides a bonding device having several sets of bonding units, each having a base and a fastening member. The base has a first connecting portion, a second connecting portion and a stopper. The circuit unit has several first positioning portions and the predetermined element has several second positioning portions. When the predetermined element is attached to the upper surface of the circuit unit by aligning the second positioning portions to the corresponding first positioning portions, the second connecting portion of the base is first fitted into the first positioning portions of the circuit unit and mounted on the circuit unit by Surface Mounted Technology (SMT). Then, the fastening member passes through the second positioning portion of the predetermined element to couple with the fastening member by several turns, and thus the predetermined element is fixed on the circuit unit.

The bonding device of the invention provides several benefits.

First, volume, especially thickness, of the electronic products is reduced when applying the bonding device to the connection of the circuit unit and the predetermined element, no post need be provided on the housing, such that assembly time of the product is shortened. Yield is increased by applying Surface Mounted Technology (SMT) on the circuit unit and the predetermined connected element, and finally, without posts or the like on the housing, the design and configuration of the electronic product are variable and volume of the electronic product is further reduced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
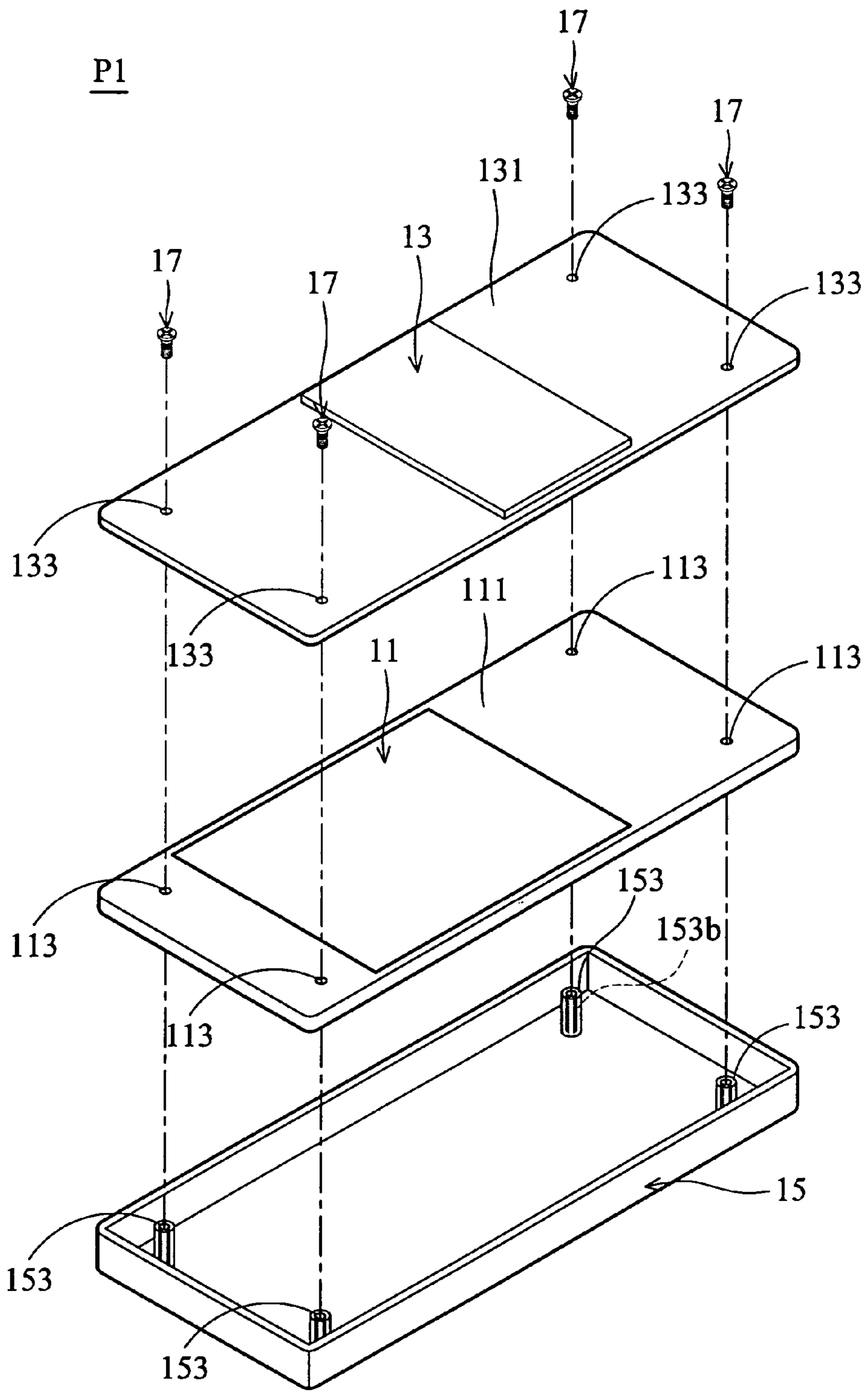
FIG. 1a ( PRIOR ART )
FIG. 1*a* is an exploded view of a conventional electronic device (P1), wherein the electronic device (P1) has a printed-circuit board (11) and a liquid crystal module (13)
Figure 1B:
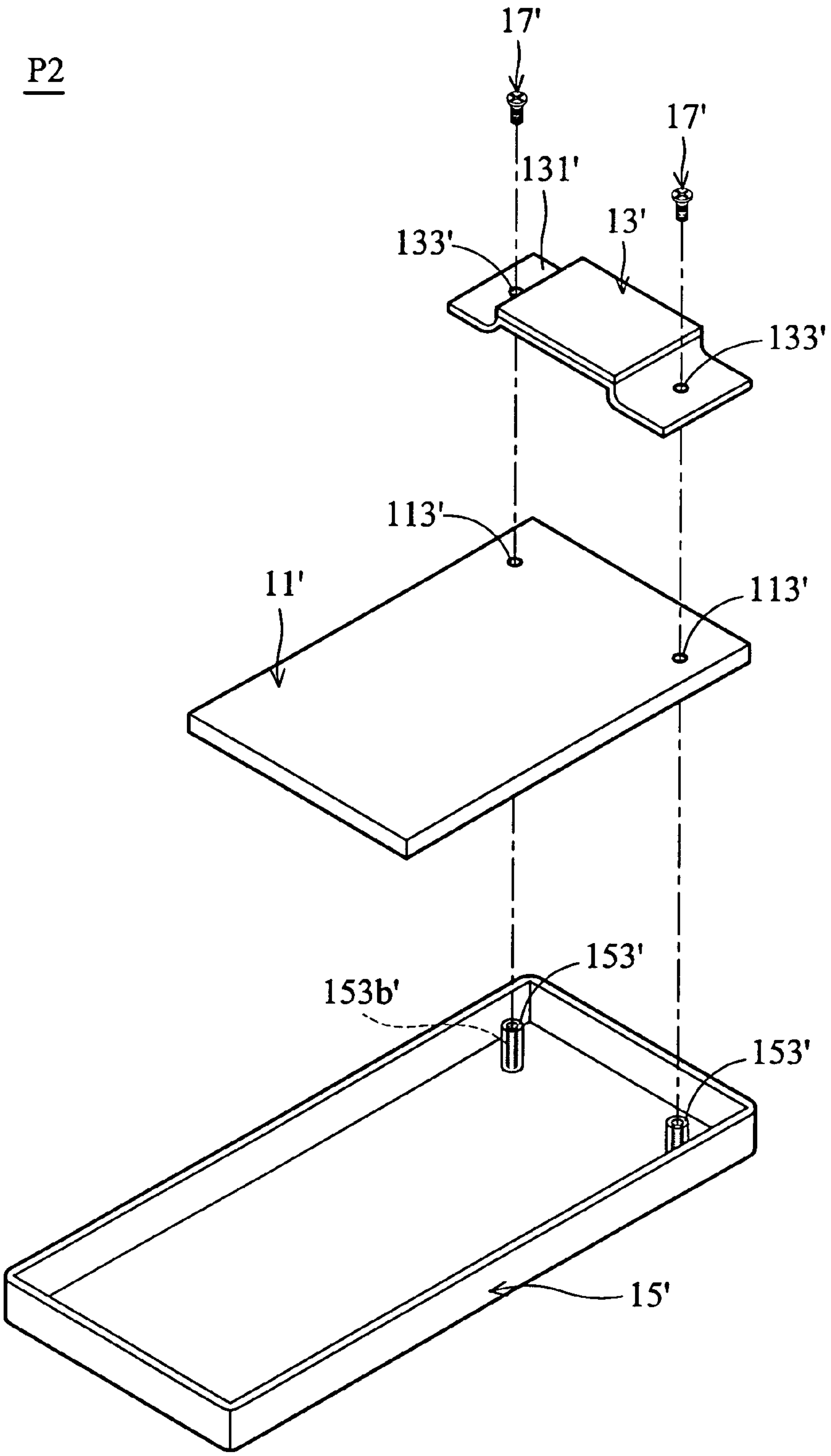
FIG. 1b ( PRIOR ART )
FIG. 1*b* is an exploded view of another conventional electronic device (P2), wherein the electronic device (P2) has a printed-circuit board (11') and a liquid crystal module (13')
Figure 2A:
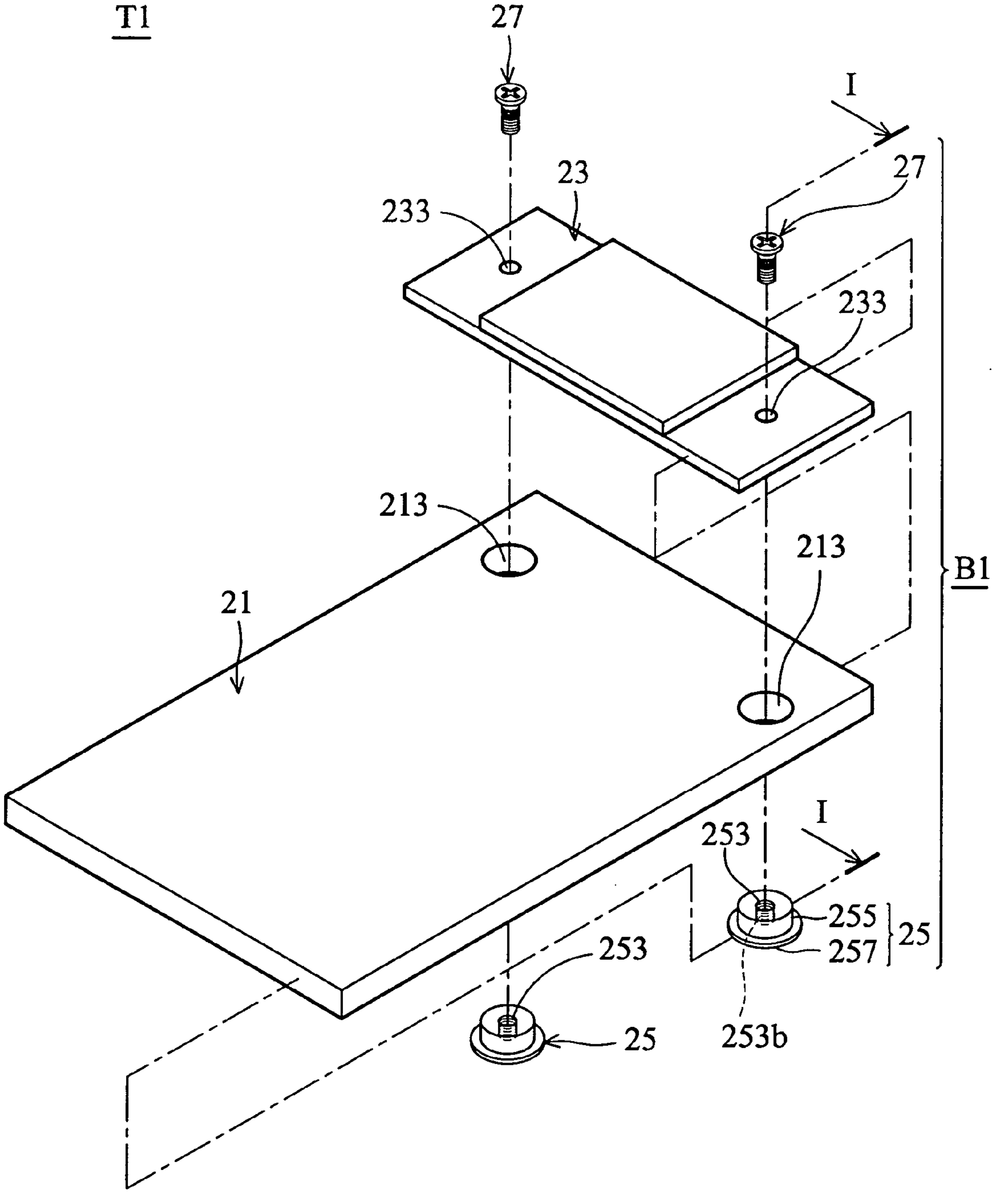
FIG. 2*a* is an exploded view of an electronic device (T1), wherein the electronic device (T1) has a circuit unit (21) and a predetermined element (23) connected together by a bonding device (B1) of a first embodiment of the invention.

In FIG. 2*a*, an electronic device T1, such as a mobile phone, PDA, LCD or the like, has a circuit unit 21 and a predetermined element 23. In this embodiment, the circuit unit 21 is a printed circuit board (PCB) and the predetermined element 23 is an LCD.

The circuit unit 21 has an upper surface 21S1, a lower surface 21S2 and a plurality of first positioning portions 213. The first positioning portions 213 are through holes penetrating the upper surface 21S1 and the lower surface 21S2. The predetermined element 23 has a plurality of second positioning portions 233 and a second contacting surface 230. The second positioning portions 233 are through holes, each corresponding to each first positioning portion 213 of the circuit unit 31, respectively.

Figure 2B:
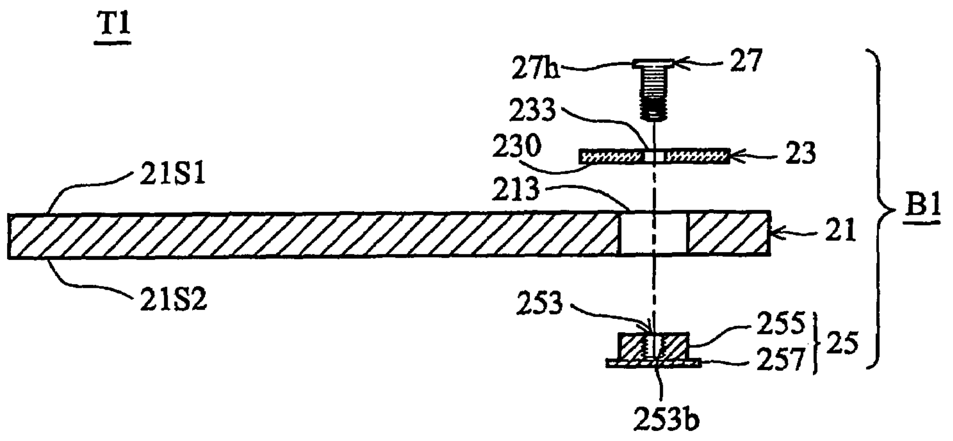
FIG. 2*b* is a sectional view of the electronic device (T1) according to a line (I—I) of FIG. 2*a;*

Referring also to FIG. 2*b*, a bonding device B1 according to a second embodiment of the invention has several sets of bonding units, each having a base 25 and a fastening member 27. The fastening member 27 can be a bolt.

The base 25 is cylindrical, having a first connecting portion 253, a second connecting portion 255, and a stopper 257. The second connecting portion 255 is the main body of the base 25, and an outer diameter of the second connecting portion 255 is substantially equal to the inner diameter of the first positioning portions 213 of the circuit unit 21. The first connecting portion 253 is a blind hole formed in the central region of the second connecting portion 255, and a threaded area 253*b* is formed on the inner wall of the first connecting portion 253. The stopper 257 is a step portion formed on one end of the second connecting portion 255 and has an outer diameter exceeding that of the second connecting portion 255. Also, the outer diameter of the stopper 257 exceeds that of the first positioning portion 213 of the circuit unit 21.

When the second contacting surface 230 of the predetermined element 23 is attached to the upper surface 21S1 of the circuit unit 21, each of the second positioning portion 233 is aligned with the corresponding first positioning portions 213. The second connecting portion 255 of the base 25 is first fitted into the first positioning portions 213 of the circuit unit 21 and mounted on the circuit unit 21 by Surface Mounted Technology (SMT). Then, the fastening member 27 passes through the second positioning portion 233 of the predetermined element 23 to couple with the fastening member 27 by several turns.

Figure 2C:
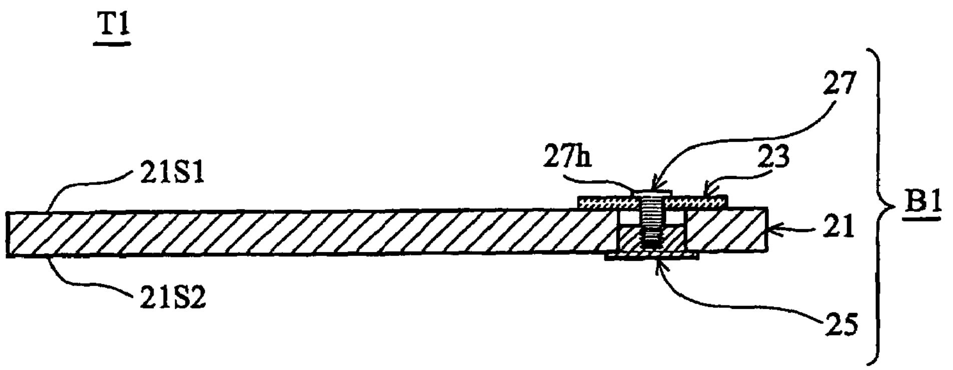
FIG. 2*c* is a sectional view of the assembled electronic device (T1) according to FIG. 2*b;*

In FIG. 2*c*, the movement of the fastening member 27 is terminated when the stopper 257 is pressed on the lower surface 21S2 of the circuit unit 21 and the head 27*h* is pressed on the predetermined element 23. Thus, the predetermined element 23 is fixed on the circuit unit 21.

Figure 3A:
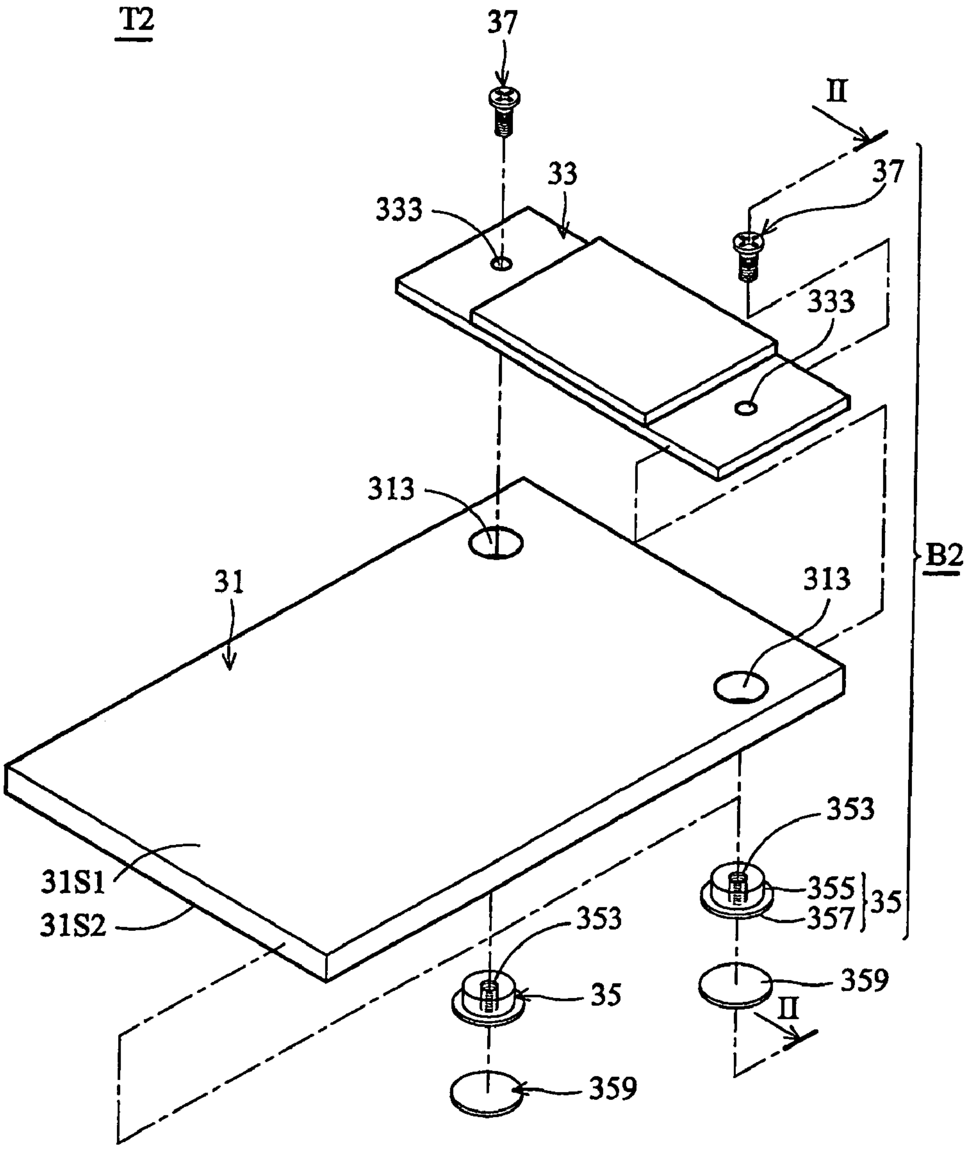
FIG. 3*a* is an exploded view of an electronic device (T2), wherein the electronic device (T2) has a circuit unit (31) and a predetermined element (33) connected together by a bonding device (B2) of a second embodiment of the invention.

In FIG. 3*a*, an electronic device T2 has a circuit unit 31 and a predetermined element 33 having a second contacting surface 330. In this embodiment, the circuit unit 31 is a printed circuit board (PCB) and the predetermined element 33 is an LCD tube. The circuit unit 31 of bonding device (B2) is the same as the circuit unit 21 in the first embodiment, having an upper surface 31S1, a lower surface 31S2 and a plurality of first positioning portions 313. The first positioning portions 313 are through holes penetrating.

The circuit unit 31 is the same as the circuit unit 21 in the first embodiment, having an upper surface 31S1, a lower surface 31S2 and a plurality of first positioning portions 313. The first positioning portions 313 are through holes penetrating the upper surface 31S1 and the lower surface 31S2. The predetermined element 33 has a plurality of second positioning portions 333. The second positioning portions 333 are through holes, each corresponding to each first positioning portion 313 of the circuit unit 31, respectively.

Figure 3B:
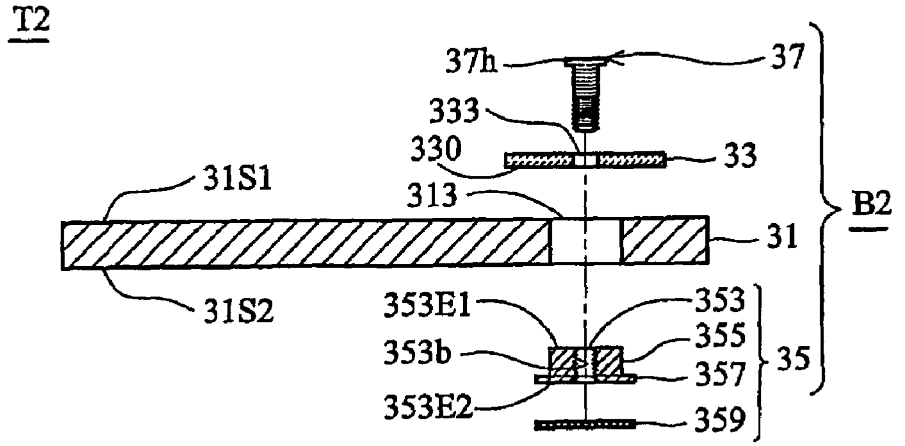
FIG. 3*b* is a sectional view of the electronic device (T2) according to a line (II—II) of FIG. 3*a*.

Referring also to FIG. 3*b*, a bonding device B2 according to a second embodiment of the invention has s several sets of bonding units, each having a base 35 and a fastening member 37. The fastening member 37 can be a bolt.

The base 35 is cylindrical, having a first connecting portion 353, a second connecting portion 355, a stopper 357, a sealing element 359, a front end 353E1 and a back end 353E2. The sealing element 359 is a membrane, a thin plate or the like.

The base 35 differs from the base 35 of the first embodiment in that the first connecting portion 353 is a through hole penetrating the front end 353E1 to the back end 353E2. The second connecting portion 355 is the main body of the bases 35, and an outer diameter of the second connecting portion 355 is substantially equal to the inner diameter of the first positioning portions 313 of the circuit unit 31. A threaded area 353*b* is formed on the inner wall of the first connecting portion 353. The stopper 357 is a step portion formed on one end of the second connecting portion 355 and has an outer diameter exceeding that of the second connecting portion 355. Also, the outer diameter of the stopper 357 exceeds that of the first positioning portion 313 of the circuit unit 31.

When the second contacting surface 330 of the predetermined element 33 is attached to the upper surface 31S1 of the circuit unit 31, each second positioning portion 333 is aligned with the corresponding first positioning portions 313. The second connecting portion 355 of the base 35 is first fitted into the first positioning portions 313 of the circuit unit 31 and mounted on the circuit unit 31 by SMT. From the front end 353E1 of the base 35, the fastening member 37 passes through the second positioning portion 333 of the predetermined element 33 to couple with the fastening member 37 by several turns. The sealing element 359 is attached to the back end 353E2 of the base 35 and seals the first connecting portion 353, such that SMT is applied on the lower surface 3152 of the circuit unit 31.

Figure 3C:
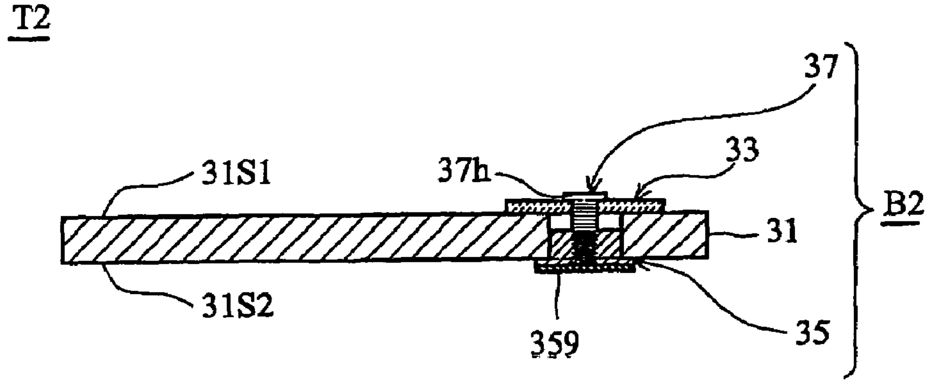
FIG. 3*c* is a sectional view of the assembled electronic device (T2) according to FIG. 3*b*.

In FIG. 3*c*, the movement of the fastening member 37 is terminated when the stopper 357 is pressed on the lower surface 31S2 of the circuit unit 31 and the head 37*h* is pressed on the predetermined element 33. Thus, the predetermined element 33 is fixed on the circuit unit 31.

While this invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. A bonding device for connecting a circuit unit provided with a first positioning portion and a predetermined element provided with a second positioning portion, the bonding device comprising:

a base partially disposed in the first positioning portion of the circuit unit, provided with a first connecting portion, a second connecting portion fitted in the first positioning portion of the circuit unit and a stopper pressed on the circuit unit, wherein the stopper has a diameter exceeding that of the first positioning portion of the circuit unit; and a fastening member connected to the first connecting portion of the base, connecting the circuit unit to the predetermined element.

2. The bonding device as claimed in claim 1, wherein the first connecting portion is a blind hole.

3. The bonding device as claimed in claim 1, wherein the first connecting portion is a trough hole.

4. The bonding device as claimed in claim 1, wherein the base further comprises a front end, a back end and a sealing element extending from the second connecting portion, and the first connecting portion is a through hole penetrating the front end to the back end and the sealing element is disposed on the back end.

5. The bonding device as claimed in claim 1, wherein the first positioning portion and the second positioning portion are through holes.

6. The bonding device as claimed in claim 1, wherein the first connecting portion is a threaded hole.

7. The bonding device as claimed in claim 1, wherein the circuit unit is a printed circuit board.

8. The bonding device as claimed in claim 1, wherein the predetermined element is a tube.

9. The bonding device as claimed in claim 1, wherein the fastening member is a bolt.

10. The bonding device as claimed in claim 1, wherein the sealing element is a membrane.

11. The bonding device as claimed in claim 1, wherein the circuit unit is formed by Surface Mounted Technology.

12. The bonding device as claimed in claim 1, wherein the first connecting portion, the second connecting portion and the stopper are integrally formed.

13. The bonding device as claimed in claim 1, wherein the stopper extends from the first connecting portion and the second connecting portion.

14. A bonding device for connecting a circuit unit provided with a first positioning portion and a first contacting surface and a predetermined element provided with a second positioning portion and a second contacting surface, the bonding device comprising:

a base partially disposed in the first positioning portion of the circuit unit, provided with a first connecting portion, a second connecting portion filled in the first positioning portion of the circuit unit and a stopper pressed on the circuit unit when the second contacting surface of the predetermined element contacts the first contacting surface of the circuit unit, wherein the stopper has a diameter exceeding that of the first positioning portion of the circuit unit; and a fastening member connected to the first connecting portion of the base, connecting the circuit unit to the predetermined element.

15. The bonding device as claimed in claim 14, wherein the base further comprises a front end, a back end and a sealing element extending from the second connecting portion, and the first connecting portion is a through bole penetrating the front end to the back end and the sealing element is disposed on the back end.

* * * * *